US009041716B2

(12) United States Patent
Ogles et al.

(10) Patent No.: US 9,041,716 B2
(45) Date of Patent: May 26, 2015

(54) MULTIVALUE BAR GRAPH DISPLAYS AND METHODS OF IMPLEMENTING SAME

(75) Inventors: Charles Callis Ogles, Gardnerville, NV (US); Barrett Joseph Fuhrmann, Jr., Carson City, NV (US); Scott Williams, Minden, NV (US); Charles David Whitefield, II, Carson City, NV (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 13/404,804

(22) Filed: Feb. 24, 2012

(65) Prior Publication Data

US 2013/0222392 A1 Aug. 29, 2013

(51) Int. Cl.

| | |
|---|---|
| ***G06T 11/20*** | (2006.01) |
| ***G09G 5/22*** | (2006.01) |
| ***G05B 19/409*** | (2006.01) |

(52) U.S. Cl.

CPC .... *G05B 19/409* (2013.01); *G05B 2219/23138* (2013.01)

USPC ........................................ 345/440; 345/440.2

(58) Field of Classification Search

CPC ... G06T 11/206; G06F 3/0481; G06F 17/246; G06Q 30/06; G06Q 40/04

USPC ..................... 345/440, 440.2, 440.1; 715/751

See application file for complete search history.

(56) References Cited

U.S. PATENT DOCUMENTS

| | | | | |
|---|---|---|---|---|
| 4,647,901 | A | 3/1987 | Teshima et al. | |
| 5,654,739 | A * | 8/1997 | Sakai et al. | 345/440.1 |
| 5,726,914 | A | 3/1998 | Janovski et al. | |
| 6,453,731 | B1 | 9/2002 | Yaegashi | |
| 2005/0273720 | A1 * | 12/2005 | Cochran et al. | 715/751 |
| 2008/0079747 | A1 * | 4/2008 | Saida et al. | 345/440.2 |
| 2010/0318934 | A1 | 12/2010 | Blevins et al. | |
| 2012/0001920 | A1 * | 1/2012 | Halpern et al. | 345/440.2 |

OTHER PUBLICATIONS

European Search Report for EP Application No. 13156435.3 completed Feb. 10, 2015.

* cited by examiner

*Primary Examiner* — Chante Harrison

(74) *Attorney, Agent, or Firm* — Fletcher Yoder, P.C.

(57) ABSTRACT

A display for showing indicia in the form of a bar graph is provided. The display is configured so that each bar of the bar graph depicts a numerical or other quantitative value of a parameter. Each bar is provided with one or more additional indicia representative of numerical values that are related to the numerical values represented by the bar(s) shown in the bar graph. Each of the one or more additional indicia is positioned to as to be superimposed over the respective bar to which the additional indicia correspond, and depict the relationship(s) between the value represented by the bar and the value represented by the one or more additional indicia.

20 Claims, 5 Drawing Sheets

MULTIVALUE BAR GRAPH DISPLAYS AND METHODS OF IMPLEMENTING SAME

BACKGROUND OF THE INVENTION

The present invention relates generally to instrumentation displays, and more specifically, to displays used in testing, monitoring and manufacturing equipment.

Active bar graph displays are a commonly used form of display found in instrumentation in industrial control rooms, on industrial testing equipment, and on individual machinery controls, for example. Such displays provide a simple and easily read and interpreted form of displaying and permitting the comparison of quantitative data, such as, for example, via spreadsheet-style applications. If a plurality of numerical values need to be shown simultaneously, e.g., for purposes of comparison of the respective numerical values, multiple "bars" are often displayed. Comparing quantitative data can be made easier by displaying the multiple bars side-by-side, with one behind and to the side of the other (in a simulated three-dimensional fashion), or in a tandem pattern, for example.

However, the available visible area that is provided on known instrument displays is often limited. For example, there may be insufficient area to permit multiple bars of a bar graph to be displayed simultaneously in side-by-side or tandem arrangement. The limited display may require the user to navigate through multiple screens in order to review or compare related data or measurements, or may require the user to use multiple separate display or monitoring devices. Alternatively, reducing the size scale of the image, in order to permit multiple bars to be seen simultaneously, may result in the image, and in particular the graduation marks or other units of measurement, being rendered too small in size to be easily seen. The use of such alternatives to enable the simultaneous viewing of related data or measurements may lead to increased costs and/or a loss of efficiency.

It would be desirable to provide a bar graph display system and method that enables multiple quantitative and/or numerical values, particularly measurements that may be directly related to one another, to be displayed in such a way that immediate visual comparison of the respective measured characteristics, including the relationships between the characteristics, is enabled.

BRIEF DESCRIPTION OF THE INVENTION

In one aspect, a display is provided which includes a control apparatus, and a display apparatus. The control apparatus receives at least one signal from at least one sensor, where the at least one signal is representative of at least one quantitative characteristic of a sensed phenomenon. The control apparatus also generates a display signal. The display apparatus depicts a display image corresponding to the at least one sensor signal transmitted by the at least one sensor. The display image includes a bar graph having at least one bar that illustrates a numerical value corresponding to the at least one quantitative characteristic of a sensed phenomenon. The bar graph also has at least one indicium that corresponds to at least one quantitative subcomponent of the at least one quantitative characteristic of a sensed phenomenon, wherein the at least one indicium is superimposed on the at least one bar of the bar graph.

In another aspect, a method for displaying an image is provided. The method includes configuring a control apparatus to receive at least one sensor signal transmitted from at least one sensor, wherein the at least one sensor signal is representative of at least one quantitative characteristic of a sensed phenomenon. The method further includes associating a display apparatus with the control apparatus, to receive a display signal generated by the control apparatus. The method further includes configuring the control apparatus to provide a display image corresponding to the at least one sensor signal from the at least one sensor, to the display apparatus. The method further includes providing in the display image a bar graph including at least one bar illustrating a numerical value corresponding to the at least one quantitative characteristic of a sensed phenomenon, and providing the display image with at least one indicium corresponding to at least one quantitative subcomponent of the at least one quantitative characteristic of a sensed phenomenon. The method further includes superimposing the at least one indicium on the at least one bar of the bar graph.

In a further aspect, an equipment control system is provided which includes at least one sensor, a control apparatus, and a display apparatus. The control apparatus receives at least one signal from the at least one sensor, where the at least one signal is representative of at least one quantitative characteristic of a sensed phenomenon. The control apparatus generates a display signal. The display apparatus depicts a display image corresponding to the at least one sensor signal transmitted by the at least one sensor, which display image includes a bar graph. The bar graph has at least one bar illustrating a numerical value corresponding to the at least one quantitative characteristic of a sensed phenomenon. At least one indicium, corresponding to at least one quantitative subcomponent of the at least one quantitative characteristic of a sensed phenomenon, is superimposed on the at least one bar of the bar graph.

DETAILED DESCRIPTION OF THE INVENTION

Although specific features of various embodiments of the invention may be shown in some drawings and not in others, this is for convenience only. In accordance with the principles of the invention, any feature of a drawing may be referenced and/or claimed in combination with any feature of any other drawing.

Figure 1:
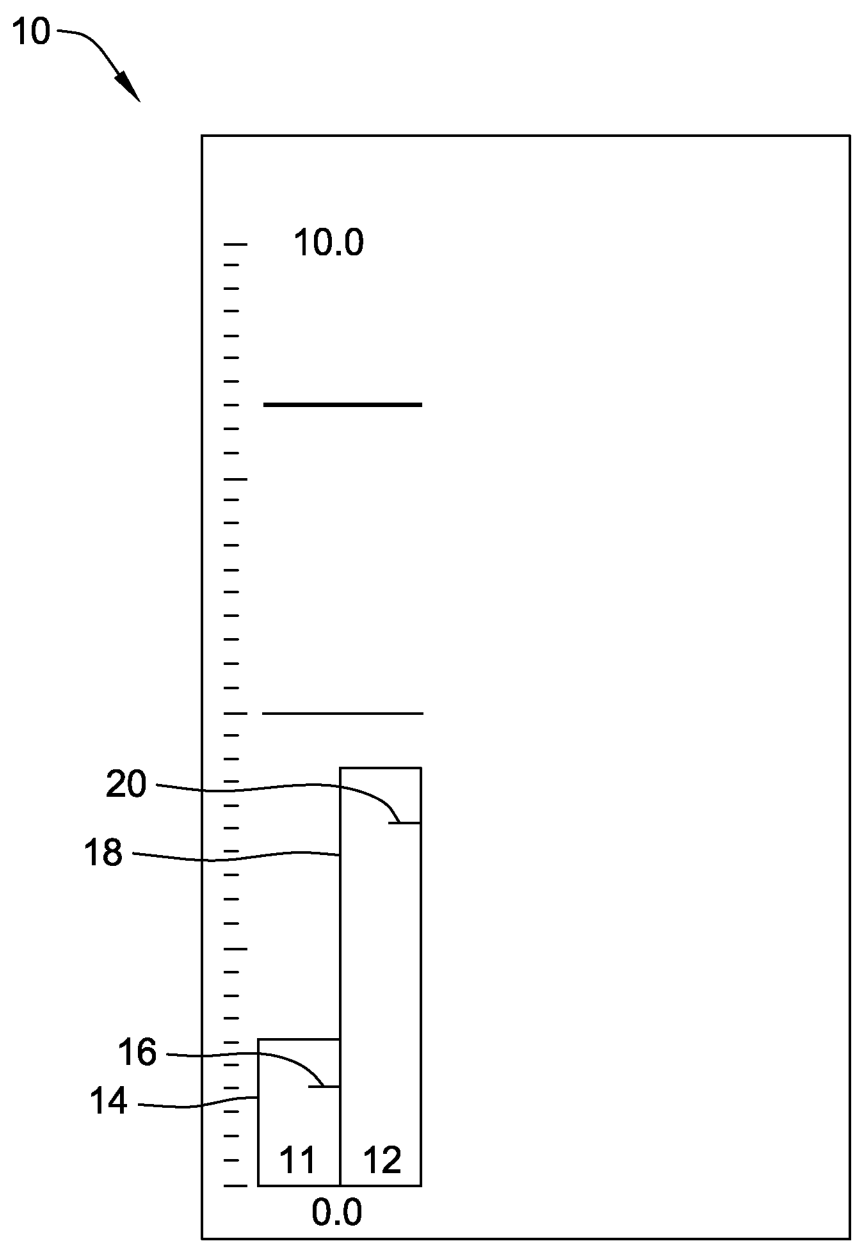
FIG. 1 illustrates an exemplary multivalue bar graph display showing a single subcomponent for each bar of the graph.

FIG. 1 is an illustration of an exemplary multivalue bar graph display showing a single subcomponent for each bar of the graph, according to an embodiment of the invention. More specifically, display 10 may be used, for example, in a measuring or control instrument (not illustrated in FIG. 1). Display 10 may be presented on any suitable display device, such as a monitor on an instrument panel in a control center, a control panel on an individual machine or testing or measurement device, screen for a desktop or portable computer, or the display on a suitably-equipped phone. Display 10 may be driven by a computer or similar device using otherwise conventional components and programming techniques, the particular details of which are not necessary to the complete understanding of the present invention. Display 10 is a bar graph display in which two bars 11 and 12 are displayed. Bars 11 and 12 may represent two separate signal channels received from a single sensor (not shown in FIG. 1), or may alternatively represent two signals transmitted from separate sensors. For example, display 10, may be configured to display both the received and processed signal output of a vibration sensor.

As a non-limiting example of the environment in which a multivalue bar graph display may be employed, a vibration signal transmitted from a vibration sensor, is a complex signal which may be broken down into two or more subcomponents or "related parameters", wherein the relationship between the overall signal (e.g., overall vibration amplitude) and a specific subcomponent (a related parameter) of the overall signal is known and is defined by a specific mathematical relationship. In vibration signal measurement and analysis, the absolute numerical value of the overall signal is greater than the numerical value of the subcomponent signal Furthermore, the relationship between the overall signal and the subcomponent, in vibration measurement and analysis, is linear. However, in the exemplary embodiment, the overall signal and the subcomponent are both measured (or calculated internally, in the computer or processor in a measurement device, for example) and subsequently visually depicted, using the same units of measurement.

In other technical fields, it may be possible that a subcomponent, or at least the absolute numerical value of the subcomponent, may be greater than an absolute numerical value of the overall measurement to which the subcomponent corresponds. Likewise, in other technical fields, the relationship between the overall measurement value and the particular subcomponent of interest may not be linear.

In one embodiment, the indicium representing the subcomponent is displayed so as to provide an indication of the relationship (e.g., relative proportion) of the subcomponent to the overall measurement, without providing a precise readout, notation or other indication of the actual numerical value of the subcomponent. An observer of the display may be able to derive an approximate numerical value of the subcomponent through interpretation of the display. In another embodiment, the system may be configured to provide an actual numerical value for the subcomponent, for example, by a digital notation on the display, over or adjacent to the tic or other indicium being used to represent the subcomponent.

In another embodiment, it may be desirable to simultaneously monitor an overall signal and its corresponding subcomponent, for each signal channel or sensor, without having to provide space for a separate bar for each numerical value to be displayed. As shown in FIG. 1, in display 10, the overall signal for channel 11 is represented by a vertical bar 14, which is shown in display 10 in a first color. The corresponding subcomponent for channel 11 is represented by an indicium, which in FIG. 1 is a horizontal tic 16, illustrated in a sufficiently contrasting color that is selected to be visible against (or through) vertical bar 14.

Similarly, the overall signal for channel 12 is represented in display 10 by a vertical bar 18 (which may be shown in the same color as bar 14 or at least in a color different than that of tic 16). The corresponding subcomponent is shown by another indicium, namely, a horizontally-extending tic 20 (which may be illustrated in the same color as tic 16, but is at least in a sufficiently contrasting color to be visible against or through vertical bar 18).

Display 10 is generated by a suitably programmed control device (not shown in FIG. 1), using otherwise conventional programming and image generation techniques, so that each of bars 14 and 16 and tics 18 and 20 will be able to respond in real time to changes in the sensor signals of channels 11 and 12, and such that tics 18 and 20 will also be able to fluctuate independently of their respective bars 14 and 16. For example, if tics 18 and 20 represent subcomponents that are in a proportional relationship to their respective overall measurements (e.g., each subcomponent is 50% of its corresponding overall measurement), then if an overall measurement represented by bar 14 decreases by 2 units, then its corresponding subcomponent would decrease by 1 unit, and tic 18 corresponding thereto would move an amount corresponding to 1 unit, independently of the movement of bar 14. The foregoing also applies to each of the other displays described, shown or suggested herein.

The superpositioning of bars 14 and 16 (representing the overall signals for channels 11 and 12) and tics 16 and 18, representing their corresponding subcomponents, may be accomplished through the use of conventional instrumentation construction, programming and graphics design techniques. Each "bar" in the bar graph is deemed to have a "footprint" representing the total area occupied by any bar, when that bar is indicating its maximum numerical value. "Superpositioning" refers to the fact that a tic is always positioned somewhere within the footprint (as defined immediately above) of its corresponding bar, regardless of the actual numerical value being represented by that corresponding bar at that specific time.

While horizontal tics are shown here as being used to represent the subcomponents for each overall signal, it should be understood that other shapes or styles of indicia may be employed, so long as they are capable of providing an indication of the quantitative relationship (e.g., proportional relationship) between the subcomponents) and the overall measurement of the subcomponents, using the same units of measurement as their respective overall signals, without departing from the scope of the invention.

Figure 5:
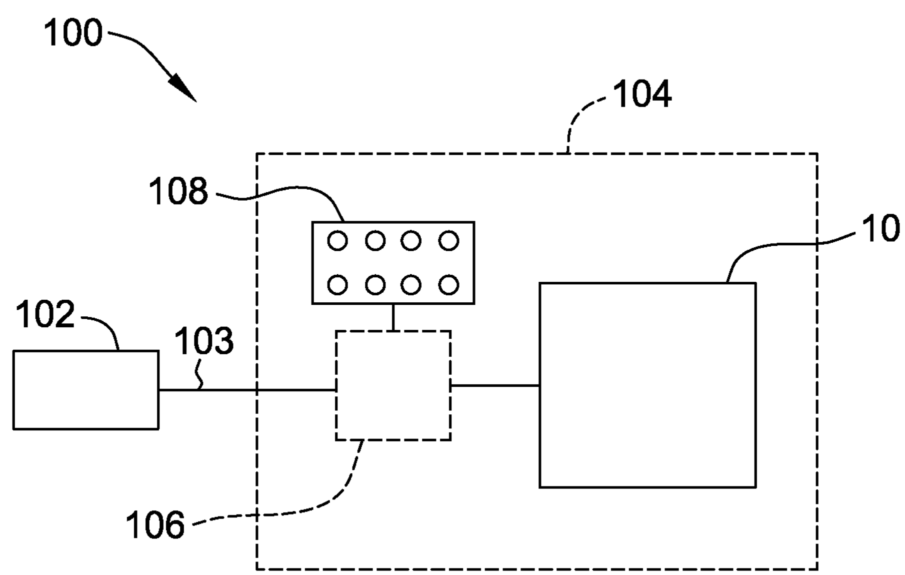
FIG. 5 is a schematic illustration of an exemplary measurement system that incorporates a multivalue bar graph display.

Display 10 may be provided as part of a display system, which, in turn, may be incorporated into an overall equipment control system, wherein "equipment control system" should be understood to include not only systems which actually regulate the operation of devices or machinery, but also systems such as monitoring or measurement systems, such as the measurement system 100 illustrated in FIG. 5. FIG. 5 is a schematic illustration of an exemplary measurement system 100 that may employ a display, such as is described herein with respect to display 10. For example, measurement system 100 may include one or more sensors 102 that are connected to a display system 104 that supports and provides display 10. Display system 104 may include one or more processors 106 that are configured to receive the raw signal(s) 103 being supplied by sensor(s) 102. In the exemplary embodiment, control panel 108 enables a user to selectively configure the images being shown on, e.g., display 10 (or any of the other displays shown and/or described herein), and select which numerical values processor(s) 106 derive from raw signal(s) 103 being transmitted from sensor(s) 102. Display system 104 may, for example, be a suitably programmed desktop or laptop computer, in which the internal processors of the desktop or laptop computer serve as processor(s) 106, its keyboard functions as control panel 108 and the screen of the desktop or laptop computer will show display 10.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Depending upon the particular application, display 10 may be established in such a way that the operator may be able to select, such as from a drop-down menu, from a number of subcomponent values to be incorporated into the display. The number of subcomponent values that may be available for selection will depend at least upon the operation being measured, the types of sensors being used, the particular numerical values being displayed, and/or the mathematical (e.g., proportional) relationships existing between the values being directly measured and those to be calculated therefrom.

Figure 2:
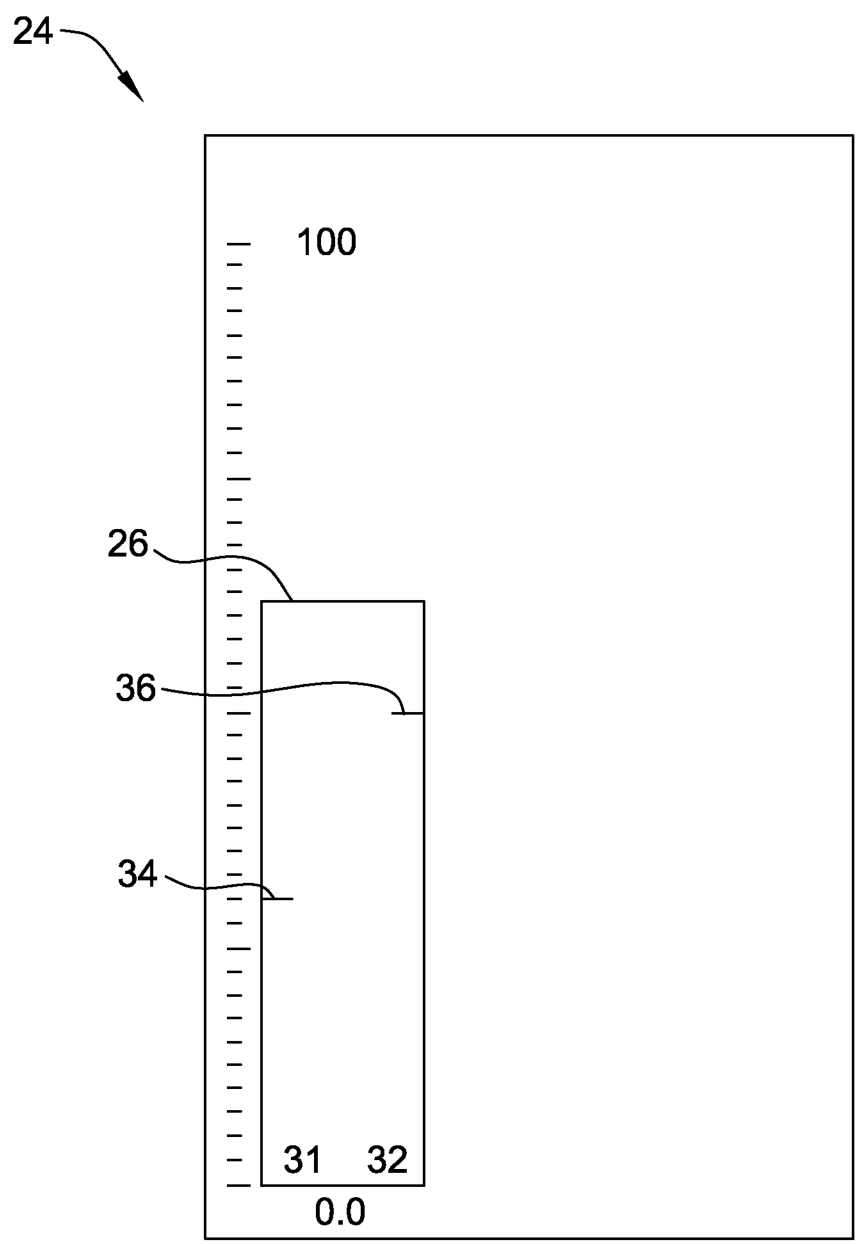
FIG. 2 shows another exemplary multivalue bar graph display showing a single bar with a plurality of subcomponents depicted.

FIG. 2 is another exemplary multivalue bar graph display 24, in which the display of subcomponents of an overall signal is provided, together with the display of a bar representing the numerical value of an overall signal itself. More specifically, in display 24, an overall signal value or other numerical parameter, of an instrument is represented by vertical bar 26. The numerical value of the parameter represented by vertical bar 26 is one which may be derived from a mathematical relationship between two other numerical values corresponding, e.g., derived from the vibration signals corresponding to two separate channels of a sensor, or alternatively from signals transmitted from separate sensors. Specifically, in FIG. 2, the subcomponent relational values corresponding to the signals of channels 31 and 32 are represented by horizontal tics 34 and 36. Tics 34 and 36 are depicted using a color that is in sufficient contrast or different density or the like to that of bar 26, to enable tics 35 and 36 to be easily read against bar 26. Moreover, display 24 is configured in such a manner that, depending upon the nature of the mathematical relationship between the subcomponents represented by the signals of channels 31 and 32, and the overall signal value represented by bar 26, each of bar 26 and tics 31 and 32 are movable independently with respect to each other, in response to their respective underlying signals, as described herein.

Figure 3:
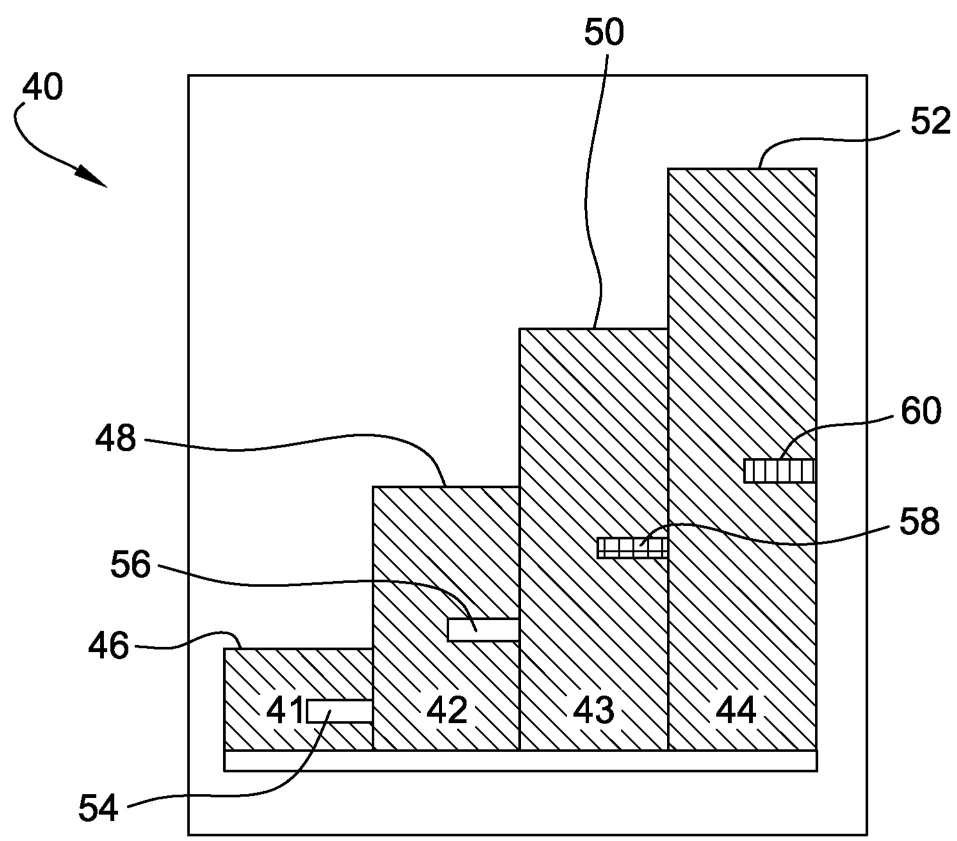
FIG. 3 shows a further exemplary multivalue bar graph display in which the depiction of each subcomponent includes at least one non-numerical qualitative feature characteristic of another aspect of the subcomponent being depicted.

It may be desirable to provide information relating to a subcomponent of an overall signal beyond the simple quantitative relationship of that subcomponent signal to the overall measurement. For example, it may be desirable to know whether a particular subcomponent is approaching or has passed some critical value threshold (thereby signifying a hazardous or dangerous condition, for example). FIG. 3 illustrates such a display 40, wherein the overall measured parameters from four channels 41-44 are represented by vertical bars 46, 48, 50 and 52, with corresponding subcomponents 54, 56, 58 and 60. FIG. 3 is an illustration of another exemplary multivalue bar graph display, in which still further information is provided, beyond the numerical values indicated by the bars 46, 48, 50, and 52, and their corresponding tics 54, 56, 58, and 60. More specifically, bars 46, 48, 50 and 52 may be illustrated in a single first color (shown by the left-to-right downward hatching). For the subcomponents, numerical values below a critical threshold may be shown in a second color (e.g., no cross-hatching, per tics 54 and 56. Subcomponent values above that threshold but below a higher threshold may be represented by a third color (checkered hatching, per tic 58) and subcomponent values above that threshold may be represented by a fourth color (vertical lines, per tic 60). In alternative embodiments of the invention, illustrative techniques other than, or in addition to, color changes, may be used to represent different characteristics of the subcomponent values.

Figure 4:
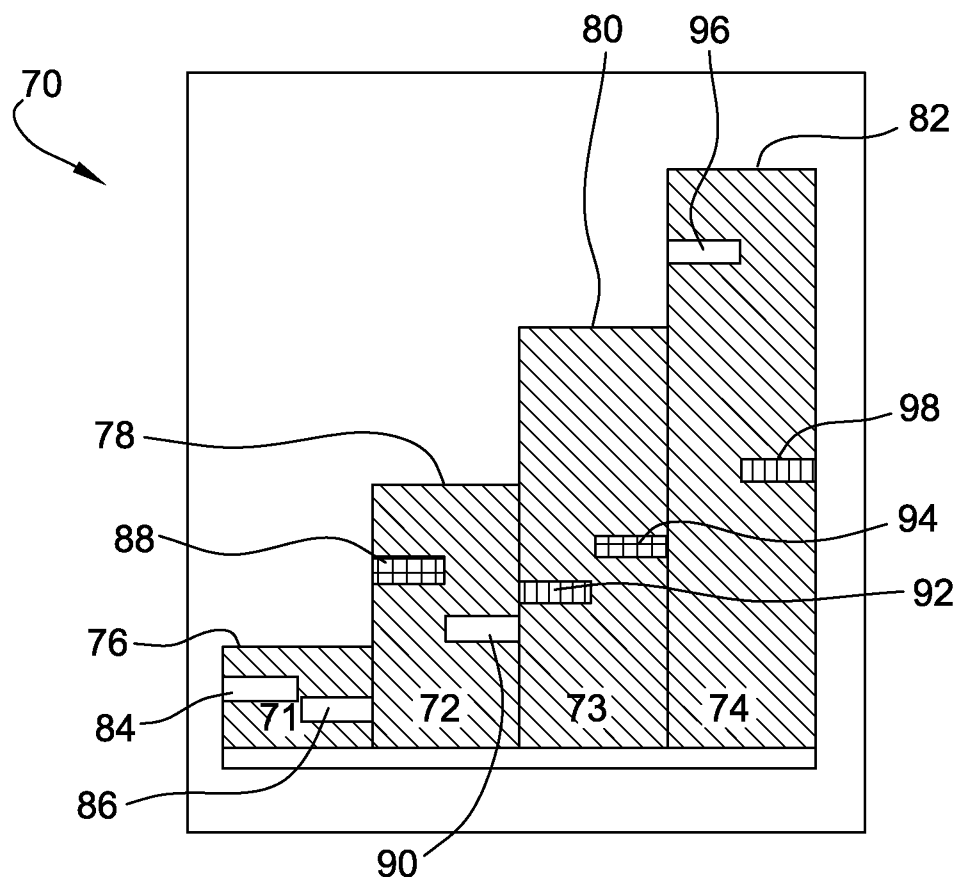
FIG. 4 shows yet another exemplary multivalue bar graph display, in which two subcomponents are shown for each bar, and in which the depiction of each subcomponent includes at least one non-numerical qualitative feature characteristic of another aspect of the subcomponent being depicted.

FIG. 4 is an illustration of still yet another exemplary multivalue bar graph display 70. Specifically, in FIG. 4, display 70 is configured in a manner similar to that of display 40 of FIG. 3, in that the tics 84, 86, 88, 90, 92, 94, 96, and 98, representing the subcomponents, may be configured to be shown in colors indicative of other status characteristics. However, in display 70, vertical bars 76, 78, 80, 82 (representing channels 71, 72, 73, and 74, respectively) are provided with tics 84, 86, 88, 90, 92, 94, 96 and 98, respectively. Each pair of tics 84 and 86, 88 and 90, 92 and 94, and 96 and 98 represents two subcomponents of each overall measurement or parameter of each channel 71-74.

The above-described embodiments provide an efficient and cost-effective apparatus and method for displaying an increased amount of information in bar graph-type displays, as compared to known bar graph displays. The superpositioning of indicia, such as tics, over the bars enables more information to be provided in a specified amount of display area, as compared to known bar graph displays. The superpositioning of indicia, such as tics, over the bars, obviates the need for a user to have to switch between screens to view and compare related numerical information, or to have to use multiple screens or entire display devices. The superpositioning of indicia, such as tics, over the bars, and the use of differentiating colors for the tics facilitates the provision of both additional quantitative information, such as the relationship (e.g., proportional relationship) between an overall measurement and a subcomponent measurement, as well as status information of a non-numerical or non-quantitative nature, within a given display area.

Exemplary embodiments of multivalue bar graph displays and methods of implementing same are described above in detail. The apparatus, method and system are not limited to the specific embodiments described herein, but rather, components of the apparatus and/or system and/or steps of the method may be utilized independently and separately from other components and/or steps described herein. For example, the multivalue bar graph display system may also be used in combination with other measurement systems and methods, and is not limited to practice with systems for measurement of vibrations as described herein. Rather, the multivalue bar graph display apparatus, systems and methods can be utilized in connection with other active, relative measurement systems, such as strain measurement systems, temperature measurement systems, and/or fluid pressure fluctuation measurement systems.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a control apparatus configured to receive a signal from a sensor, wherein the signal comprises a first quantitative value of a sensed operational parameter, and wherein the control apparatus is further configured to generate a display signal; and a display apparatus operably associated with the control apparatus, wherein the display apparatus is configured to display a bar graph including at least one bar, wherein the at least one bar comprises a graphical representation of the first quantitative value of the sensed operational parameter; and at least one indicium corresponding to a second quantitative value of the sensed operational parameter, wherein the second quantitative value comprises a subcomponent of the first quantitative value of the sensed operational parameter, wherein the first and second quantitative values have the same unit of measurement, and wherein the at least one indicium is superimposed on the at least one bar of the bar graph.

2. The system according to claim 1, wherein the display apparatus is configured to display a plurality of bars, wherein each bar displayed includes at least one indicium corresponding to a quantitative subcomponent of a respective one of a plurality of quantitative characteristics of sensed operational parameters.

3. The system according to claim 1, wherein the display apparatus is configured to display a non-quantitative characteristic that is representative of a status of the second quantitative value.

4. The system according to claim 3, wherein the non-quantitative characteristic comprises a color, wherein the color of the non-quantitative characteristic changes in response to a change of status of the second quantitative value.

5. The system according to claim 1, wherein the at least one indicium comprises a horizontally-extending tic.

6. The system according to claim 1, wherein the operational parameter comprises vibration.

7. A non-transitory computer readable medium having computer executable code stored thereon, the code comprising instructions to:

receive a sensor signal from a sensor, wherein the sensor signal comprises a first quantitative characteristic of a sensed operational parameter;

generate a display image of a bar graph based on the first quantitative characteristic of the sensed operational parameter, wherein the bar graph comprises at least one bar comprising a graphical representation of the first quantitative characteristic of the sensed operational parameter; and present at least one indicium corresponding to a second quantitative characteristic of the sensed operational parameter, wherein the second quantitative characteristic comprises a subcomponent of the first quantitative characteristic of the sensed operational parameter, wherein the first and second quantitative characteristics have the same unit of measurement, and wherein the at least one indicium is superimposed on the at least one bar of the bar graph.

8. The non-transitory computer-readable medium of claim 7, comprising instructions to:

provide the bar graph with a plurality of bars illustrating a plurality of numerical values corresponding to a plurality of quantitative characteristics of sensed operational parameters; and provide each bar with at least one indicium corresponding to a quantitative subcomponent of the quantitative characteristic of the sensed operational parameters.

9. The non-transitory computer-readable medium of claim 7, wherein the at least one indicium includes a non-quantitative characteristic that is representative of a status of the second quantitative characteristic.

10. The non-transitory computer-readable medium of claim 9, wherein the non-quantitative characteristic comprises a color, wherein the color of the non-quantitative characteristic changes in response to a change of status of the second quantitative value.

11. The non-transitory computer-readable medium of claim 10, wherein the at least one indicium comprises a horizontally-extending tic.

12. The control system according to claim 11, wherein the display apparatus is configured to display a plurality of non-quantitative characteristics, wherein each non-quantitative characteristic of the plurality of non-quantitative characteristics represents a status of each quantitative value of the plurality of quantitative values.

13. The control system according to claim 12, wherein each non-quantitative characteristic of the plurality of non-quantitative characteristics comprises a color.

14. The control system according to claim 13, wherein the color changes in response to a change of status of a respective quantitative value of the plurality of quantitative values.

15. The control system according to claim 14, wherein the plurality of indicia each comprise a horizontally-extending tic.

16. The non-transitory computer-readable medium of claim 7, wherein the operational parameter comprises strain, temperature, or fluid pressure fluctuation.

17. A control system, comprising:

a sensor;

a control apparatus configured to receive a signal from the sensor, wherein the signal comprises a total quantitative value of a sensed operational parameter, and wherein the control apparatus is further configured to generate a display signal; and a display apparatus operably coupled to the control apparatus, wherein the display apparatus is configured to display a bar graph including at least one bar, wherein the at least one bar comprises a graphical representation of the total quantitative value of the sensed operational parameter; and a plurality of indicia corresponding to a plurality of quantitative values of the sensed operational parameter, wherein each quantitative value of the plurality of quantitative values corresponds to a subcomponent of the total quantitative value of the sensed operational parameter, and wherein the plurality of indicia are superimposed on the at least one bar of the bar graph.

18. The control system according to claim 17, wherein the display apparatus is configured to display a plurality of bars, wherein each bar displayed includes a plurality of indicia.

19. The control system according to claim 17, wherein the control system comprises a measurement system.

20. The control system according to claim 17, wherein the control system comprises a system configured to regulate an operation of one or more external devices.

* * * * *